US008725372B2

(12) United States Patent
Rinck et al.

(10) Patent No.: US 8,725,372 B2
(45) Date of Patent: May 13, 2014

(54) METHOD FOR KISS POINT ADAPTATION (75) Inventors: Rainer Rinck, Hersbruck (DE); Markus Schuerlein, Freiberg (DE); Tobias Soller, Ismaning (DE)

(73) Assignees: GETRAG Getriebe-und Zahnradfabrik Hermann Hagenmeyer GmbH & Cie KG, Untergruppenbach (DE); Bayerische Motoren Werke Aktiengesellschaft, Munich (DE); Conti Temic microelectronic GmbH, Nuremberg (DE)

( * ) Notice: Subject to any disclaimer, the term of this patent is extended or adjusted under 35 U.S.C. 154(b) by 321 days.

(21) Appl. No.: 12/783,447

(22) Filed: May 19, 2010

(65) Prior Publication Data

US 2010/0282561 A1    Nov. 11, 2010

Related U.S. Application Data (63) Continuation of application No. PCT/EP2008/009841, filed on Nov. 20, 2008.

(30) Foreign Application Priority Data

Nov. 21, 2007  (DE) .......................... 10 2007 057 081

(51) Int. Cl.
  *G06F 7/00*  (2006.01)
(52) U.S. Cl.
  USPC .................. 701/67; 701/51; 701/53; 701/54; 701/58; 701/68; 74/330; 74/331; 74/339; 74/340; 192/3.55; 192/3.61; 192/3.63; 477/70; 477/77; 477/79; 477/80; 477/84
(58) Field of Classification Search
  None
  See application file for complete search history.

(56) References Cited

U.S. PATENT DOCUMENTS 4,817,776 A * 4/1989 Tateno et al. ................... 477/78
5,842,375 A  12/1998 Reeves et al.
(Continued)

FOREIGN PATENT DOCUMENTS

DE     40 11 856 A1    4/1990
DE    195 40 921 A1   11/1995
(Continued)

OTHER PUBLICATIONS

English Translation PCT International Preliminary Report on Patentability; Application No. PCT/EP2008/009841; Filed Nov. 20, 2008.

*Primary Examiner* — Khoi Tran
*Assistant Examiner* — Jonathan L Sample
(74) *Attorney, Agent, or Firm* — Knobbe, Martens, Olson & Bear, LLP (57) ABSTRACT A method for adjusting the point of engagement of a friction clutch of a step-variable transmission for a motor vehicle, in particular a friction clutch of a dual clutch transmission. The friction clutch is controllably actuated by means of a clutch actuator and at least one synchronizer shifting clutch is controllably actuated by means of a shift actuator for the engagement and disengagement of a gear ratio of the spur-gear transmission. A set-point of the clutch actuator for the point of engagement of the friction clutch is adjusted as a function of a speed gradient value, which ensues from a transitional state with the friction clutch actuated and the shifting clutch actuated, once the shifting clutch is opened. The transitional state is established by setting the clutch actuator and the shift actuator to a respective transitional value substantially at the same time or, at least in sections, in parallel.

31 Claims, 6 Drawing Sheets (56) References Cited

U.S. PATENT DOCUMENTS

| | | | |
|---|---|---|---|
| 5,871,419 A * | 2/1999 | Amendt | 477/180 |
| 6,015,031 A * | 1/2000 | Dorfschmid et al. | 192/3.58 |
| 6,086,514 A * | 7/2000 | Jones et al. | 477/180 |
| 6,490,944 B1 | 12/2002 | Heinzel et al. | |
| 6,502,652 B2 * | 1/2003 | Rogg | 180/65.21 |
| 6,506,139 B2 * | 1/2003 | Hirt et al. | 477/3 |
| 6,909,955 B2 * | 6/2005 | Vukovich et al. | 701/51 |
| 7,158,873 B2 * | 1/2007 | Eich et al. | 701/68 |
| 7,549,944 B2 * | 6/2009 | Tabata et al. | 477/5 |
| 7,632,213 B2 * | 12/2009 | Disch-Simon et al. | 477/115 |
| 7,823,711 B2 * | 11/2010 | Uhler et al. | 192/48.8 |
| 7,850,570 B2 * | 12/2010 | Jager et al. | 477/77 |
| 7,935,021 B2 * | 5/2011 | Tabata et al. | 477/5 |
| 8,313,415 B2 * | 11/2012 | Lochocki et al. | 477/167 |
| 8,392,083 B2 * | 3/2013 | Hodrus et al. | 701/67 |
| 8,479,904 B2 * | 7/2013 | Krieberneg et al. | 192/20 |
| 8,504,263 B2 * | 8/2013 | Wang et al. | 701/53 |
| 8,577,573 B2 * | 11/2013 | Blessing et al. | 701/68 |
| 2002/0119864 A1 * | 8/2002 | Harries | 477/79 |
| 2003/0054920 A1 * | 3/2003 | Berger et al. | 477/70 |
| 2004/0172184 A1 * | 9/2004 | Vukovich et al. | 701/51 |
| 2004/0260444 A1 * | 12/2004 | Winkelmann et al. | 701/67 |
| 2006/0207655 A1 * | 9/2006 | Xiang et al. | 137/118.02 |
| 2007/0017309 A1 * | 1/2007 | Hasegawa et al. | 74/331 |
| 2007/0155581 A1 * | 7/2007 | Tabata et al. | 477/3 |
| 2007/0155584 A1 * | 7/2007 | Tabata et al. | 477/70 |
| 2007/0175720 A1 * | 8/2007 | Yoshida et al. | 192/3.63 |
| 2007/0199790 A1 * | 8/2007 | Whitmer et al. | 192/70.252 |
| 2007/0208480 A1 * | 9/2007 | Disch-Simon et al. | 701/59 |
| 2008/0009388 A1 * | 1/2008 | Tabata et al. | 477/2 |
| 2011/0125378 A1 * | 5/2011 | Blessing et al. | 701/68 |
| 2011/0245036 A1 * | 10/2011 | Lochocki et al. | 477/167 |

FOREIGN PATENT DOCUMENTS

| | | |
|---|---|---|
| DE | 196 52 244 A1 | 12/1996 |
| DE | 197 51 455 A1 | 11/1997 |
| DE | 199 31 160 A1 | 7/1999 |
| DE | 199 39 818 C1 | 8/1999 |
| DE | 100 54 867 | 11/2000 |
| DE | 101 01 597 A1 | 1/2001 |
| DE | 101 13 700 A1 | 3/2001 |
| DE | 102 24 064 A1 | 5/2002 |
| DE | 102 44 393 A1 | 9/2002 |
| EP | 0 859 171 A1 | 2/1998 |
| EP | 09 931 961 A | 1/1999 |
| EP | 1 067 008 A | 7/2000 |
| EP | 1 467 127 A1 | 4/2003 |
| EP | 1 741 950 A1 | 7/2005 |
| WO | WO 2004/076224 A1 | 9/2004 |
| WO | WO 2004/076225 A1 | 9/2004 |

* cited by examiner

METHOD FOR KISS POINT ADAPTATION

CROSS-REFERENCE FOR RELATED APPLICATIONS

This is a Continuation application of International patent application PCT/EP 2008/009841, filed Nov. 20, 2008 which claims the priority of German patent application DE 10 2007 057 081, filed Nov. 21, 2007.

BACKGROUND OF THE INVENTION

The present invention relates to a method for adjusting the point of engagement of a friction clutch of a step-variable transmission for a motor vehicle, in particular a friction clutch of a dual clutch transmission.

In drivetrains comprising a spur-gear transmission a friction clutch, which has the function of a drive-away and disconnect clutch, is generally arranged between the spur-gear transmission and a prime mover (such as an internal combustion engine). In the case of dual clutch transmissions a dual clutch arrangement is provided between the two transmission units and the prime mover. These friction clutches may be embodied as dry or wet-plate clutches and are subject to a certain degree of wear. In conventional manual-shift transmissions the increasing clutch wear is compensated for by a modified actuation of the clutch on the part of the driver.

In automated spur-gear transmissions (such as automated shift transmissions (AST) or dual clutch transmissions (DCT)) the friction clutch is generally actuated by an associated clutch actuator. The clutch actuator may be a hydraulic or an electromechanical actuator, for example.

The actuator may furthermore be pressure-, power- or path-controlled.

As a powershift clutch, the friction clutch is also designed to transmit, at least briefly, high torques which are equal to or generally even greater than the torque delivered by the prime mover. For a comfortable engagement, the friction clutch has to be brought from the opened state into the closed state by way of a slipping state. In so doing the input element and the output element of the friction clutch bear against one another, a torque being transmitted from a certain point in time onwards. As the point of engagement of the friction clutch, at which a certain transmission of a torque is possible, a point is defined (a control variable of the clutch actuator), at which the friction clutch transmits a specific, relatively small torque, for example a value <20 Nm.

For reliable, comfortable and also rapid gear shifts it is very important, in the case of automated step-variable transmissions, to know at what control variable of the clutch actuator this point of engagement is reached. As mentioned above, in the course of time this may vary due to wear (of the clutch plates, for example), mechanical tolerances or other influencing variables (for example settling of the clutch springs). Even relatively transient variable parameters, such as the temperature, for example, play a part in this.

In the prior art various methods have been disclosed for adjusting the point of engagement of a friction clutch.

DE 196 52 244 A1 relates to a method for kiss point adaptation, in which the engine torque is measured as an important parameter. One basic approach is to run to multiple operating points in order to obtain a reliable adaptation by averaging.

WO 2004/076224 A1 discloses a method for determining the torque transmitted by a friction clutch by comparing the rotational speeds of the engine and the transmission input, taking into account the synchronization force, particularly in overrun conditions as the engagement force rises.

WO 2004/076225 A1 discloses a characteristic curve adaptation with the engine running, the clutch being closed at a defined value, before progressively synchronizing a gear and then determining the synchronization control variable at which the rotational speeds of the transmission input and the engine diverge.

EP 0 931 961 A1 relates to a method of calibration for a control clutch at constant engine speed, the clutch calibration value being obtained from a target speed adjustment, which is determined from a profile resistance time. The profile resistance time represents a speed adjustment varying as a function of the friction characteristic, the clutch in particular being opened and closed and a measurement being taken of the time within which the speed of a gearwheel varies by a specific amount.

A similar, iterative method is disclosed by EP 0 859 171 A1.

DE 195 40 921 A1 is concerned with the idea of arbitrarily activating a clutch in order to establish the correlation between the clutch torque and a control variable.

A method for controlling the torque transmission is furthermore disclosed by DE 199 39 818 C1. The speed of travel due to the engagement of one clutch should here not be equal to zero, a parallel clutch being kept disengaged. The point of engagement of the parallel clutch is determined through at least partial engagement of this clutch, a measurement being taken of the variation in the speed of one clutch half per unit time.

DE 102 44 393 A1 relates to the determination of the point of engagement through measurement of the pressure profile and determination of the first derivative of this on a hydraulic cylinder.

DE 100 54 867 discloses a method for determining a creep point of a friction clutch. A first creep point is set and the clutch torque is measured. Failing agreement in the first step, a second creep point is then set. A value situated between the slip point and the first creep point is here selected as reference point. The new second creep point is then set so that the desired torque and the torque actually transmitted correspond.

DE 101 13 700 A1 discloses a method for determining an engine friction torque. The method is used to determine the torque applied to the friction clutch from the engine torque.

A method for determining a biting point of a friction clutch is furthermore disclosed by EP 1 741 950 A1. A friction clutch is opened so that the transmission input speed falls. The clutch is then closed again until the fall in the speed is arrested. The clutch is then closed further until the speed remains constant or falls. The biting point is calculated from this.

DE 101 01 597 A1 discloses a method for gearshift control, in which the engine torque and the clutch torque are controlled. The control varies as a function of speed differentials.

DE 197 51 455 A1 relates to a method for clutch control, a set clutch capacity being adjusted by a control unit on the basis of a characteristic function. The characteristic function is here continuously adapted.

DE 102 24 064 A1 discloses a method for changing gear. In this case a synchronization is cancelled through the determination of a 'cut-off point', which varies as a function of a speed gradient of the synchronized gearwheel.

Finally, EP 1 067 008 A1 discloses a method for clutch characteristic curve adaptation, for a dual clutch transmission.

The intention here is to adapt the clutch characteristic curve of whichever clutch is currently not being used to transmit a torque (the so-called free friction clutch). This is done by first closing the clutch with a specific control force and waiting until the transmission input shaft has reached the synchronous speed (that is to say it is turning together with the engine shaft). A synchromesh of the associated free transmission unit is then actuated until a sufficient speed differential prevails. This synchromesh is then released and the speed gradient of the transmission input shaft is then determined. The value of the previously transmitted clutch torque is then calculated from this. On the basis of this value a clutch characteristic curve adaptation is then performed in connection with the previously established clutch control force.

BRIEF SUMMARY OF THE INVENTION

Against this background the object of the invention is to specify an improved, in particular a more rapid method for adjusting the point of engagement of a friction clutch.

This object is achieved by a method for adjusting the point of engagement of a friction clutch of a step-variable transmission for a motor vehicle, in particular a friction clutch of a dual clutch transmission, the friction clutch being controlled, preferably being controllably actuated, by means of a clutch actuator, and at least one synchronizer shifting clutch being controllably actuated by means of a shift actuator for the engagement and disengagement of a gear ratio of the spur-gear transmission, a set-point of the clutch actuator for the point of engagement of the friction clutch furthermore being adjusted as a function of a speed gradient value, which ensues from a transitional state with the friction clutch actuated and the shifting clutch actuated, once the shifting clutch is opened, the transitional state being established by setting the clutch actuator and the shift actuator to a respective transitional value substantially at the same time.

Setting the clutch actuator and the shift actuator to respective transitional values substantially at the same time represents a means of establishing the transitional state more rapidly. The point of engagement can thereby be adjusted even in relatively short phases, in which the associated transmission unit is not needed in vehicle operation. It is furthermore possible not to delay any gearshift pending (in which the free transmission unit is then used).

Conversely this results in an increased probability that the method for adjusting the point of engagement will not be interrupted by a gearshift demanded by the driver or by vehicle operation.

A transitional value may be a fixed value or also a signal that varies over time, for example.

The point of engagement is generally adjusted directly as a function of the speed gradient value determined after performing the method according to the invention. There is consequently no need to calculate the torque transmitted by the friction clutch in the process. A specific, generally also calculable correlation exists, however, between the speed gradient value determined and the torque transmitted by the friction clutch in the transitional state. In other words, it is also possible to infer the transmitted clutch torque from the speed gradient value, if this is of interest.

The object is therefore achieved in full.

It is particularly advantageous if the clutch actuator in the transitional state is set to a transitional value which corresponds to the previous set-point for the point of engagement.

This serves to ensure that the adjustment of the point of engagement takes place on the basis of conditions such as prevail in normal friction clutch operation on reaching the point of engagement. It is generally also feasible, however, to set the clutch actuator in the transitional state to a value other than the previous set-point, the aim being to fix the transitional value so that the friction clutch can transmit only a comparatively low torque (for example <20 Nm).

It is furthermore advantageous if the shift actuator is activated in the transitional state in order to close the associated shifting clutch.

In this embodiment it is advantageous that during the transitional state virtually no torque fluctuations can occur over the shifting clutch and constant speed ratios therefore prevail on commencement of the evaluation of the speed gradient value.

According to an alternative embodiment the shift actuator is activated in the transitional state in order to transmit a higher torque via the shifting clutch than via the friction clutch, but without closing the associated shifting clutch.

In this embodiment it is advantageous that a somewhat greater safeguard is afforded against fault situations, since the associated shifting clutch of the free transmission is not brought into positively interlocking engagement.

It is furthermore advantageous overall if the adjustment of the point of engagement of the friction clutch occurs in an inactive branch of the dual clutch transmission, whilst the vehicle is underway.

Such a procedure cannot be performed in an automated spur-gear transmission with only one input clutch and one individual transmission branch, since in vehicle operation the single friction clutch and the transmission are not free. In the case of a dual clutch transmission, on the other hand, the free branch (that is to say the free transmission unit and the free friction clutch) may be used to undertake an adjustment of the point of engagement of the free friction clutch whilst the vehicle is in operation and torque is being transmitted to the output via the other branch of the dual clutch transmission. It will be obvious that both friction clutches of the dual clutch transmission are thereby adjusted whilst the vehicle is in operation, according to which branch is currently free.

In principle the shifting clutch used for adjusting the point of engagement may be assigned to any gear ratio of the free transmission unit.

It is particularly advantageous, however, if the shifting clutch used for adjusting the point of engagement is assigned to that gear ratio of the free transmission unit which is adjacent to the gear ratio used in the active branch.

If the gear ratio 3 (the third gear) in the active branch is engaged, for example, the shifting clutch for the gear ratio 2 or the shifting clutch for the gear ratio 4, for example, can be used for adjusting the point of engagement of the friction clutch in the free branch. It is advantageous here that the speed differentials occurring do not become too great, so that overall the method according to the invention can be executed more rapidly and with less wear.

Whilst in the dual clutch transmission the adjustment of the point of engagement of the friction clutch in the inactive branch can take place whilst underway, in an alternative embodiment the adjustment of the point of engagement of the friction clutch is performed whilst the vehicle is stationary.

This embodiment can naturally be used in dual clutch transmissions, among other things when learning the point of engagement of a clutch. However, this embodiment can also be performed, for example, in an automated spur-gear transmission having just one friction clutch and a single transmission branch.

According to an altogether preferred embodiment a reference measurement is performed prior to the adjustment of the point of engagement, in order to determine the behaviour occurring due to friction losses (for example from bearings in the transmission etc.) and due to the drag torque of the clutch, and to take these into account in subsequent adjustments of the point of engagement.

The drag torque may be composed, for example, of a clutch drag torque and a torque loss in the transmission.

The accuracy of the adjustment of the point of engagement can thereby be improved. In other words the adaptation of the point of engagement can be adjusted independently of the prevailing drag torque.

It is particularly advantageous here if in the reference measurement an adjustment of a transitional value of the shift actuator and a subsequent opening of the associated shifting clutch together with a determination of the speed gradient value are performed whilst the friction clutch is open.

In other words the reference measurement may be carried out in the same way as the method according to the invention, in which the clutch actuator is set to a transitional value. In the reference measurement, however, the friction clutch remains opened, so as to be able to thereby observe the behaviour of the free transmission unit and to take account of this in the ensuing adjustment of the point of engagement by the method according to the invention.

It is preferred, overall, if the opening of the shifting clutch in the method according to the invention ensues from the transitional state, once the transitional value of the clutch actuator has attained a value within a set range.

In this way it is possible to ensure that the opening of the shifting clutch from the transitional state occurs only when a predefined state is attained on the friction clutch.

According to a further altogether preferred embodiment the speed gradient value, as a function of which the set-point of the clutch actuator for the point of engagement is adjusted, is the speed gradient value of the input shaft of the transmission.

In the case of automated shift transmissions a sensor is generally provided, which measures this input speed. No additional hardware cost is therefore necessary in order to implement the method according to the invention.

In the case of a dual clutch transmission it will be obvious that in each case it is the speed of the input shaft of the associated (free) transmission unit which is monitored in order to determine the speed gradient value.

It should further be noted in this context that where reference is made in the present application to a speed or a speed gradient of a specific shaft, this may similarly imply the speed or the speed gradient of any other shaft, the speed of which is proportional thereto (that is to say, for example, a positively interlocking or non-positive connection, such as that via a gear set or a closed coupling).

It is likewise advantageous overall if the speed gradient value, as a function of which the set-point of the clutch actuator for the point of engagement is adjusted, is measured at a point in time immediately before the relevant speed has attained a value that ensues on the basis of the transitional value of the clutch actuator.

Where the relevant speed is the input speed of the transmission, for example, the speed gradient value is obtained immediately before the input speed has reached the engine speed once again (assuming that at the transitional value of the clutch actuator a force closure ensues between the input element and the output element of the relevant friction clutch).

For example, the measurement of the speed gradient value may be performed at a time at which the speed is still 50 to 200 rpm, in particular approximately 75 to 125 rpm, ahead of the target speed.

It is furthermore advantageous if the target speed is a speed of an input element of the friction clutch, in particular the engine speed (which is generally available as a measured value).

It is also preferred if the majority of measurements of the speed gradient are completed when the speed has reached a value which differs from the target speed by a first predefined speed differential.

It is also preferred if the majority of measurements of the speed gradient are commenced once the speed has varied from the transitional state by a second predefined speed differential.

These measures serve to eliminate marginal phenomena.

It is furthermore advantageous if the majority of measurements of the speed gradient are filtered by weighting more recent measured values more heavily than earlier measured values.

It is preferred here if the filtering is performed according to the following recursion formula:

$$DG_{n+1}(\text{filtered})=DG_{n+1}(\text{unfiltered})*K1+DG_n(\text{filtered})*K2,$$

where $DG_n$ is the nth measured value of the speed gradient and where K1 and K2 are constants, for which K1>K2.

It is particularly preferred if K1+K2=1.

According to a preferred embodiment the transitional state is established in that a process for setting the clutch actuator to a transitional value and a process for setting the shift actuator to a transitional value are, at least in sections, carried out in parallel.

The processes for setting the clutch actuator and the shift actuator to the respective transitional value are not necessarily equally rapid. For example, the process for setting the clutch actuator to the transitional value may be slower than the process for setting the shift actuator to the transitional value.

According to a further preferred embodiment the shifting clutch is opened from the transitional state as soon as the clutch actuator and the shift actuator have reached their respective transitional state.

In this embodiment the shifting clutch is opened from the transitional state as soon as the slower of the two processes is concluded, that is to say as soon as the respective transitional value is reached.

The time cycle can thereby be optimized still further.

It is furthermore preferred overall if the clutch actuator and the shift actuator are activated so that the shift actuator reaches its transitional value earlier than the clutch actuator.

As mentioned above, the process for setting the clutch actuator to the transitional value may be slower than the process for setting the shift actuator to the transitional value. In this case the process for setting the shift actuator to the transitional value could be initiated so that the shift actuator and the clutch actuator reach their transitional state simultaneously.

In the preferred embodiment, in which the shift actuator reaches its transitional value earlier than the clutch actuator, it is advantageous that the shift actuator, owing to the generally still opened clutch, 'sees' a lower torque, that is to say it can be actuated with the expenditure of less force.

The earlier attainment of the transitional value of the shift actuator moreover has the advantage that when the clutch actuator reaches its transitional value no further interaction can take place with the process for setting the shift actuator to its transitional value. This results in a greater stability of the process at the point in time when the transitional value of the clutch actuator is attained, so that the boundary conditions with multiple such processes occurring in succession are more constant. This results in a greater comparability of successive processes.

It is further preferred if a process for setting the clutch actuator to a transitional value and a process for setting the shift actuator to a transitional value are initiated substantially at the same time.

It is further preferred overall if the clutch actuator and/or the shift actuator are activated so that the respective transitional value is attained without overshooting.

This serves, particularly in the case of a hydraulic actuation, to prevent a sign reversal of the hydraulic pressure. Problems of hysteresis can thereby be avoided.

It is further preferred overall if the clutch actuator and the shift actuator can be activated independently of one another, that is to say, for example, they are each connected to a hydraulic source via their own pressure control values or each have their own electromechanical drives. The simultaneity or parallelism of the processes can thereby be effectively achieved.

Overall, depending on its particular features, the present invention affords the following advantages:

- It results in a rapid execution of the method for adjusting the point of engagement and for characteristic curve adaptation.
- The method of speed gradient measurement is independent of the starting speed differential, since the effects of the μV curve (coefficient of friction over the differential speed) are not included, especially if a filtered value is used as speed gradient value.
- The method of speed gradient measurement does not presuppose any quasistationary conditions.
- A clutch adjustment signal monitoring is possible. For example the actual clutch pressure can be monitored during the transitional state. In the event of an excessive deviation from the set-point pressure the method can be discontinued, for example.
- When carrying out a reference measurement with the clutch open, it is possible to take account of the drag torque acting on the free transmission unit, which results, for example, from a clutch drag torque and a torque loss of the shaft.
- The hardware and software allow the closest possible parallel activation of the clutch actuator and the shift actuator.
- A good shift quality and good drive-away sequence (safety criterion) result over the operating service life.
- The method according to the invention can be performed as often as possible (whenever the necessary boundary conditions are fulfilled), but it may also be carried out just at specific times (for example no more than every 30 seconds or even at a significantly longer interval, such as each day), for example, or solely during servicing.
- It is generally also possible to monitor the running performance and to perform the method according to the invention as a function of this.
- The method may also be reversed by using the method according to the invention to monitor the clutch pressure sensor, on the assumption that the point of engagement of the friction clutch is correctly set.

It goes without saying that the aforementioned features and those yet to be explained below can be used not only in the particular combination specified but also in other combinations or alone, without departing from the scope of the present invention.

BRIEF DESCRIPTION OF THE SEVERAL VIEW OF THE DRAWING

Exemplary embodiments of the invention are represented in the drawing and will be explained in more detail in the following description. In the drawing.

DETAILED DESCRIPTION OF THE INVENTION

Figure 1:
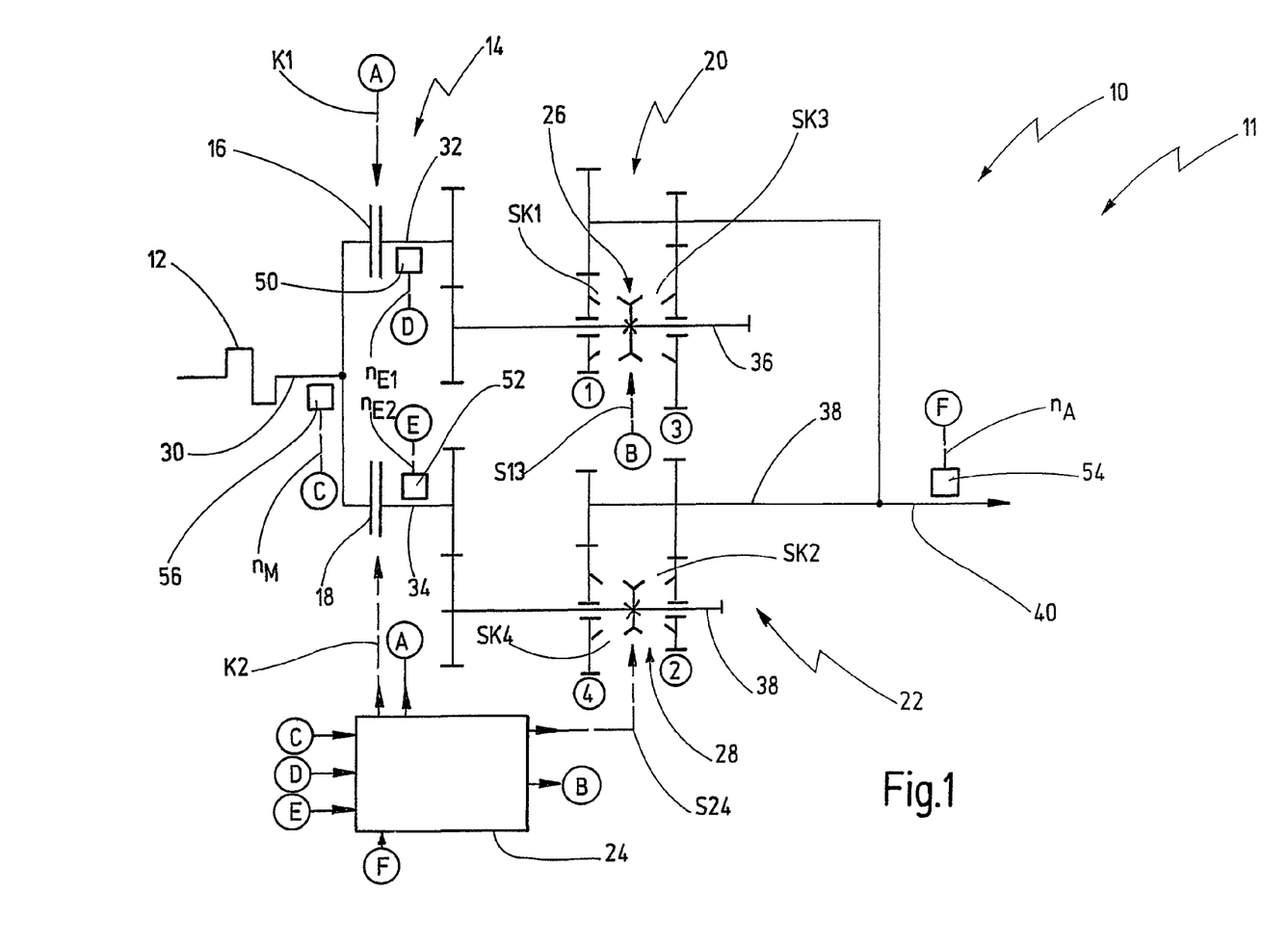
FIG. 1 shows a schematic representation of a dual clutch transmission for a motor vehicle.

FIG. 1 in schematic form shows a drivetrain of a motor vehicle 11, the drivetrain comprising a prime mover 12, such as an internal combustion engine (or also an electric motor or a hybrid drive unit), and a dual clutch transmission 10.

The dual clutch transmission 10 comprises a dual clutch arrangement 14 having a first friction clutch 16 and a second friction clutch 18.

The dual clutch transmission 10 further comprises a first transmission unit 20 and a second transmission unit 22. The first friction clutch 16 and the first transmission unit 20 form a first branch, and the second friction clutch 18 and the second transmission unit 22 form a second branch of the dual clutch transmission 10.

The dual clutch transmission 10 further comprises a control device 24, which is designed to automatically activate the dual clutch transmission 10 (and where necessary other components of the drivetrain).

The dual clutch transmission 10 has a plurality of gear ratios, the oddly numbered gear ratios being assigned to the first transmission unit 20 and the evenly numbered gear ratios to the second transmission unit 22. The dual clutch transmission 10 may have five, six, seven or more gear ratios. For reasons of clarity the dual clutch trans-mission 10 in FIG. 1 is only represented with four gear ratios. The gear ratios 1 and 3 are actuated by a shifting clutch pack 26, which comprises a first shifting clutch SK1 and a second shifting clutch SK3. The gear ratios 2 and 4 are actuated by a second shifting clutch pack 28, which again comprises a first shifting clutch SK2 and a second shifting clutch SK4.

The shifting clutches SK are each designed as synchronizer shifting clutches. Alternatively it is also feasible to design the shifting clutches as simple jaw clutches, in which case, however, additional means must be provided for synchronization purposes, for example a separate brake or the like, which can exercise the corresponding synchronization function.

The input elements of the friction clutches 16, 18 are together connected to an engine output shaft 30 of the prime mover 12.

The output element of the friction clutch 16 is connected to a first transmission input shaft 32 of the first transmission unit 20. The output element of the friction clutch 18 is connected to a second transmission input shaft 34 of the second transmission unit 22.

The first transmission unit 20 comprises a countershaft 36. The second transmission unit 22 comprises a second countershaft 38.

On the output side the transmission units 20, 22 are connected to a common transmission output shaft 40, which may be connected, for example, to a propeller shaft or an input element of a transverse differential.

The layout of the dual clutch transmission 10 shown and the sensors and actuators shown are to be taken only by way of example, as a basis for the description of the invention. The invention explained below can at the same time be applied both to drivetrains for longitudinal or transverse installation, and to other types of transmissions having an input-side friction clutch, which serves as drive-away and/or disconnect clutch, and an element comparable to a shifting clutch.

The control device 24 is connected to a schematically indicated clutch actuator K1 for actuating the first friction clutch 16 and to a second clutch actuator K2 for actuating the second friction clutch 18. The control device 24 is further connected to a first shift actuator S13 for actuating the shifting clutch pack 26 and to a second shift actuator S24 for actuating the second shifting clutch pack 28. A sensor 50 registers the speed $n_{E1}$ of the first transmission input shaft. A sensor 52 registers the speed $n_{E2}$ of the second transmission input shaft 34. A sensor 54 registers the speed $n_A$ of the transmission output shaft 40. A sensor 56 registers the speed $n_M$ of the engine output shaft 30.

The drive output generated by the prime mover 12 is alternatively transmitted either via the first friction clutch 16 and the first transmission unit 20 to the transmission output shaft 40 or via the second friction clutch 18 and the second transmission unit 22 to the transmission output shaft 40. When transmitting drive output via one of the transmission units (for example via the gear ratio 3 in the transmission unit 20) the friction clutch 18 of the other branch is opened, so that an adjacent gear ratio in the parallel (free) transmission unit 22 can already be engaged. In tractive operation, for example, the next highest gear ratio is engaged, in coasting operation, for example, the next lowest gear ratio is engaged. A gear change then occurs in that the two friction clutches 16, 18 are actuated with an overlap, in such a way that the gear change can be performed under load.

For adjusting the point of engagement of the friction clutches 16, 18, a method is used, which will be explained below with reference to FIGS. 2 to 4 and which can be applied, for example, to the dual clutch transmission shown in FIG. 1.

The adjustment of the point of engagement is here in each case performed on the friction clutch via which no drive output is currently being transmitted, so that the method can also be performed whilst the vehicle is underway.

Figure 2:
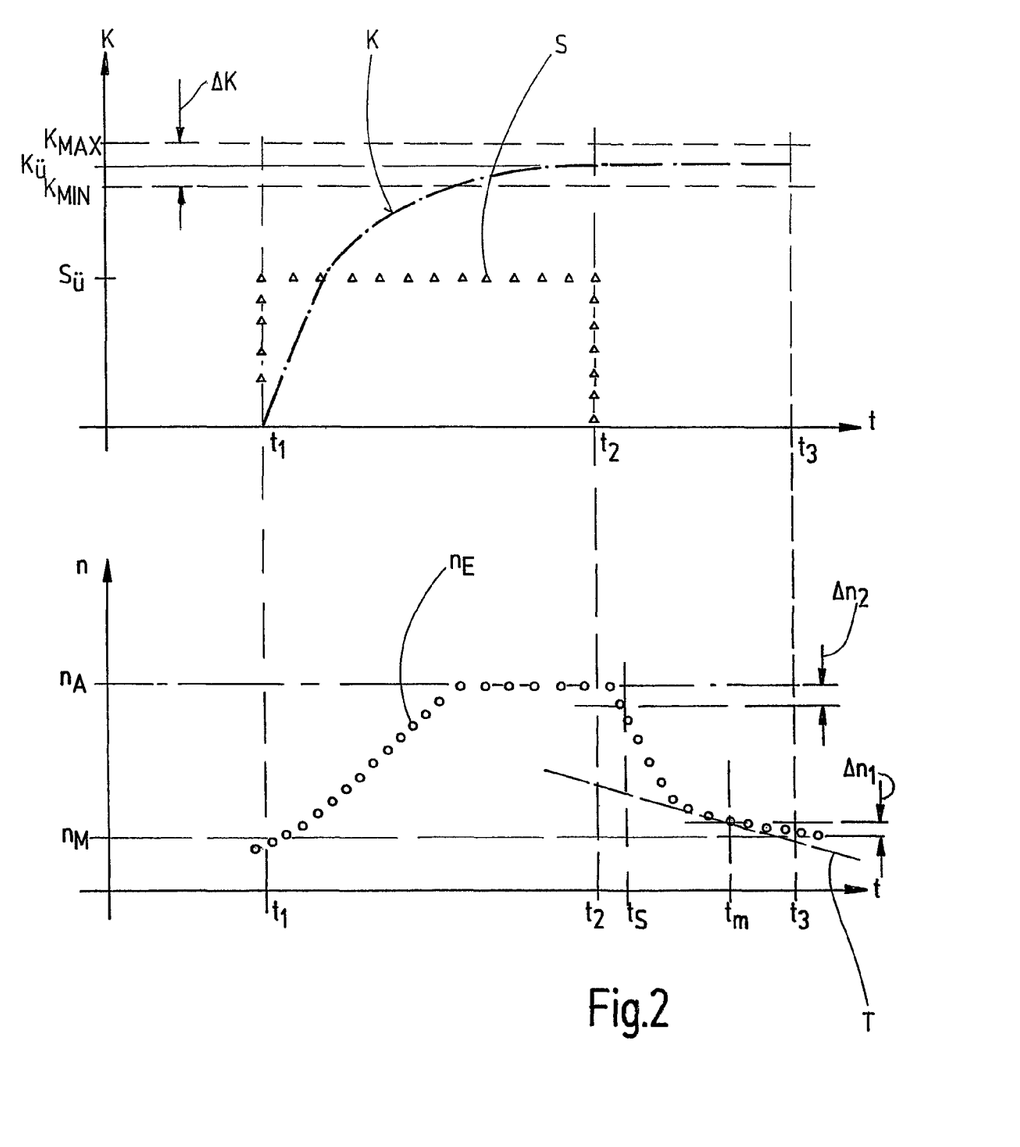
FIG. 2 shows diagrams of a friction clutch control variable and a shifting clutch control variable and of speeds in order to explain the method according to the invention.

FIG. 2 in schematic form shows the main sequences in the activation of the clutch actuator K and a shift actuator S used in this, together with resulting speed profile $n_E$ of the associated transmission input shaft.

To initiate the method for adjusting the point of engagement of the friction clutch (for example the friction clutch 16) the clutch actuator K and the shift actuator S are actuated at approximately the same time or in parallel with one another at $t_1$ and set to a transitional value. The power of the drivetrain is at the same time transmitted via the other branch, so that the transmission output shaft 40 has a certain speed $n_A$, as is shown in FIG. 2. The prime mover 12 in the simplified representation in FIG. 2 furthermore runs at a constant speed $n_M$.

If, while doing this, the second gear ratio in the power-transmitting trans-mission unit 22 is engaged, for example, an adjacent gear ratio, for example the gear ratio 1, will be engaged in the free transmission unit. Shifting the associated shifting clutch SK1 by means of the shift actuator S13 consequently increases the speed $n_E$ of the free trans-mission input shaft (the transmission input shaft 32 in the example chosen). The speed is here increased to a speed that results from the transmission output shaft speed $n_A$ and the transmission ratio of the gear ratio, in this case the transmission ratio of the first gear. It will be appreciated in this context that the representations of the speeds in FIG. 2 and the succeeding figures are in each case scaled, that is to say any transmission ratios or the like are factored out.

The transitional value of the shift actuator S13 for actuation of the shifting clutch SK1 is identified by $S_{\ddot{U}}$ in FIG. 2. This may correspond to a set-point corresponding to a full engagement of the associated gear ratio, or to a defined value, in order to set the shifting clutch SK1 into a slipping state (synchronization).

As stated, the clutch actuator K is actuated in parallel with this and set to a transitional value $K_{\ddot{U}}$. The transitional value $K_{\ddot{U}}$ here corresponds to a value at which the associated friction clutch 16 is capable of transmitting only a very low torque (for example <20 Nm). The transitional value $K_{\ddot{U}}$ may be the set-point of the clutch actuator K for the point of engagement of the associated friction clutch 16, for example.

When the transitional value of the clutch actuator K is reached (or a specific time thereafter), the associated shifting clutch is opened again at time $t_2$. Since the associated friction clutch transmits a certain torque, the speed $n_E$ of the associated transmission input shaft 32 will approximate to speed $n_M$ of the prime mover 12 (at time $t_3$). The speed gradient value then prevailing is measured immediately before this state is attained (at time $t_m$). The associated value is indicated by a tangent T in FIG. 2.

As explained, the speed gradient value is determined at time $t_m$. Time $t_m$ corresponds to a state in which the speed $n_E$, except for a first speed differential $\Delta n_1$, has come into line with the speed $n_M$. The speed gradient may consequently be the value of the speed gradient at time $t_m$.

The speed gradient value, however, is preferably determined by way of filtering.

FIG. 2 shows that from a time $t_s$ the speed gradient is continuously determined (for example every 5 to 25 m). Time $t_s$ here corresponds to a time at which the speed $n_E$ has fallen by a second speed differential $\Delta n_e$ compared to the speed $n_A$. The value of $\Delta n_1$ may lie in the range from 50 to 200 rpm, preferably approximately 100 rpm. The value of $\Delta n_2$ may be in the same order of magnitude.

The majority of measured values of the speed gradient between $t_s$ and $t_m$ are filtered by weighting more recent measured values more heavily than earlier measured values. The filtering can here be performed according to the following recursion formula:

$$DG_{n+1}(\text{filtered}) = DG_{n+1}(\text{unfiltered}) * K1 + DG_n(\text{filtered}) * K2,$$

where $DG_n$ is the nth measured value of the speed gradient and where K1 and K2 are constants, for which K1>K2. It is also preferable if K1+K2=1. K1, for example, may lie in the range from 0.6 to 0.95, more preferably in the range from 0.7 to 0.9.

The speed gradient value is the last filtered measured value of the speed gradient at time $t_m$.

The gradient value (speed gradient value) of the tangent T is a measure of what torque the associated friction clutch 16 transmits on the basis of the transitional value $K_{Ü}$. Accordingly in a succeeding step of the method the set-point of the clutch actuator K for the point of engagement of associated friction clutch 16 can be adjusted or adapted on the basis of this speed gradient value.

Consequently, in the method according to the invention for adjusting the point of engagement of the associated friction clutch a transitional state is established, in which the clutch actuator K and the shift actuator S are set to a respective transitional value, $K_{Ü}$ and $S_{Ü}$ substantially at the same time (at time $t_1$). Proceeding from this transitional state, the associated shifting clutch SK is then opened (at time $t_2$), resulting in a speed gradient value, on the basis of which the set-point of the clutch actuator K for the point of engagement of the associated friction clutch 16 can be adjusted or adapted. This method is also referred to as kiss point adaptation.

As is further shown in FIG. 2, a range monitoring is also performed in respect of the control variable of the clutch actuator K. The opening of the associated shifting clutch at time $t_2$ occurs at the earliest when the control variable of the clutch actuator K lies in a range between $K_{min}$ and $K_{max}$. The associated range is denoted by $\Delta K$ in FIG. 2.

It will in general be appreciated that the method described can also be applied by selecting the next highest gear ratio in the free branch, rather than the next lowest gear ratio (such as the gear ratio 1 in the example above). It is in general naturally also feasible to engage gear ratios other than the gear ratios which in the transmission unit parallel thereto are adjacent to the gear ratio currently used to transmit the power.

Figure 3:
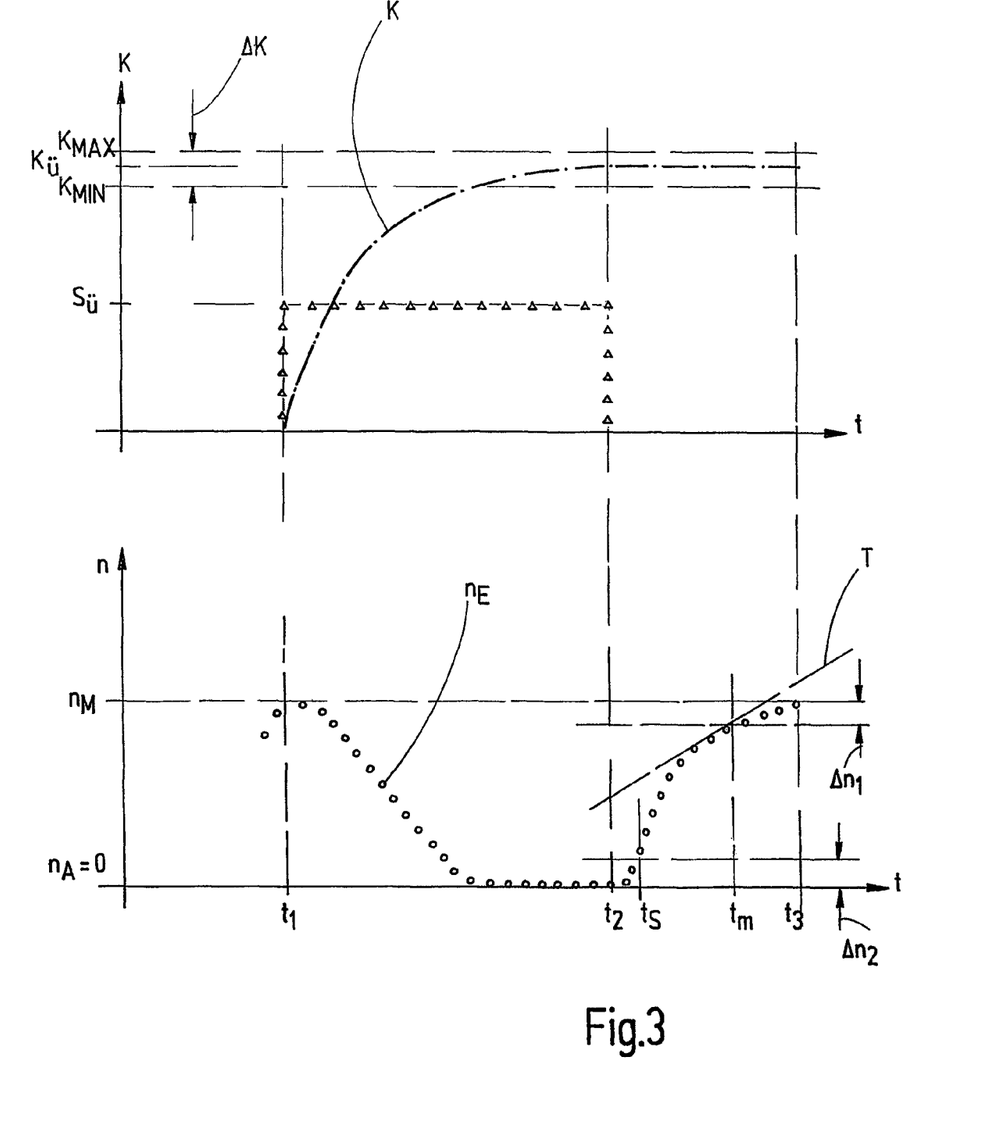
FIG. 3 shows a representation, comparable to FIG. 2, of an alternative embodiment of the method according to the invention.

FIG. 3 shows an alternative embodiment of the method according to the invention. The method corresponds in all aspects to the method that has been described with reference to FIG. 2. The only difference is that the method is performed with the vehicle 11 stationary ($n_A$=0). Accordingly the speed $n_E$ of the associated transmission input shaft is reduced to zero in the transitional state, the speed $n_E$ running up to the value of the engine speed $n_M$ after opening of the shifting clutch at time $t_2$.

The method in FIG. 3 can also be used repeatedly, for example, to teach the control 24 for initial adjustment of the point of engagement of the respective friction clutch, the set-point of the clutch actuator K for the point of engagement then being iteratively set to the correct value.

Figure 4:
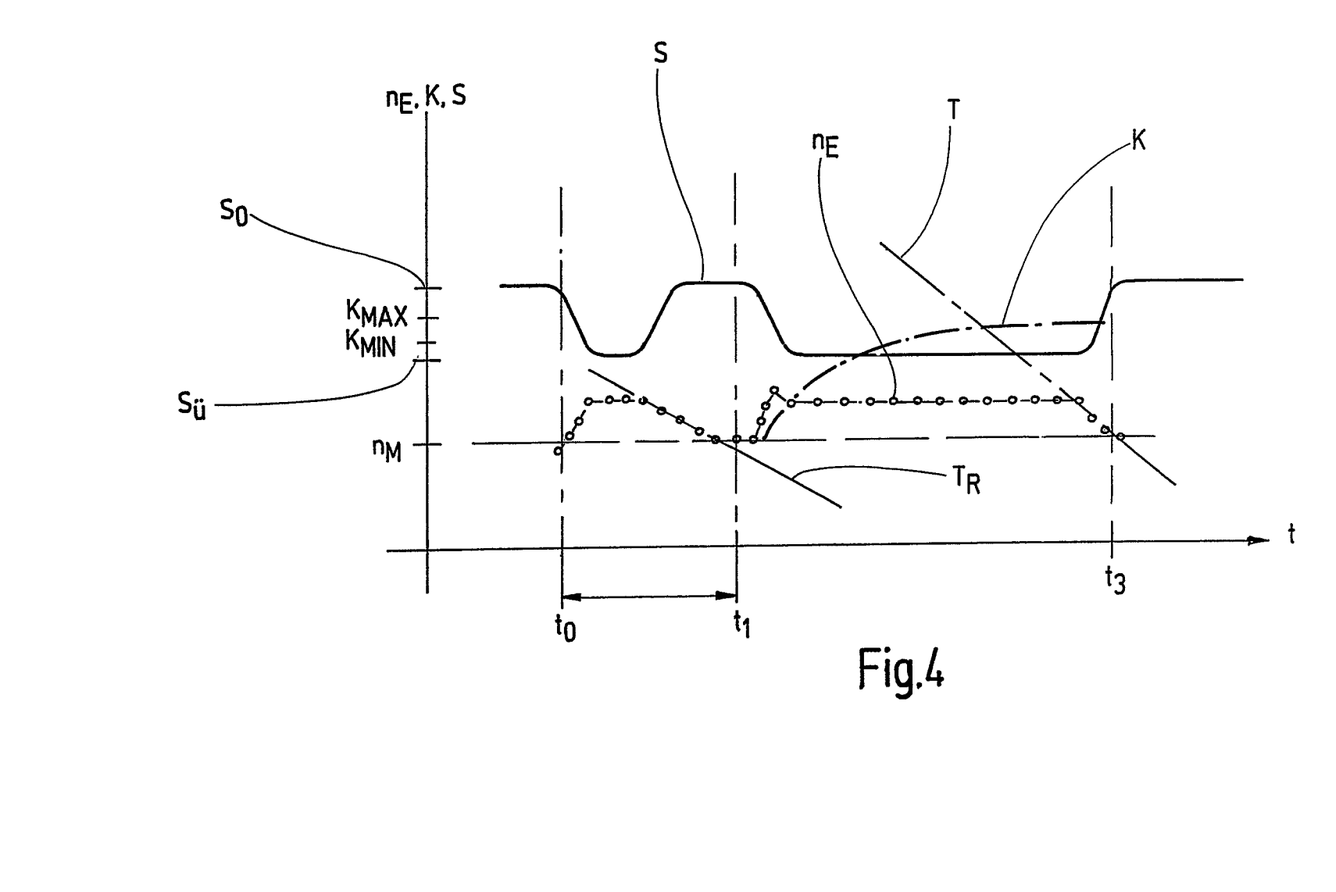
FIG. 4 shows a representation, comparable to FIG. 2, in order to explain a further embodiment of the method according to the invention.

FIG. 4 shows a further alternative embodiment of the method according to the invention.

The method generally corresponds at times $t_1$ to $t_3$ to the method that has been represented in FIG. 2.

In the method in FIG. 4 the method according to the invention is preceded by a reference measurement method, which (from time $t_0$ to $t_1$) in general resembles the subsequent measuring method. In this reference measurement method the shift actuator S is set to the transitional value $S_{Ü}$ beforehand, but the friction clutch is not actuated, a speed gradient value, which is represented by the gradient of a tangent $T_R$ otherwise being registered in the same way. This reference measurement allows the drag torque acting on the transmission unit, which results, for example, from a clutch drag torque and a torque loss of the associated shaft, to be taken into account in the subsequent calculation of the set-point of the clutch actuator for the point of engagement of the friction clutch.

Figure 5:
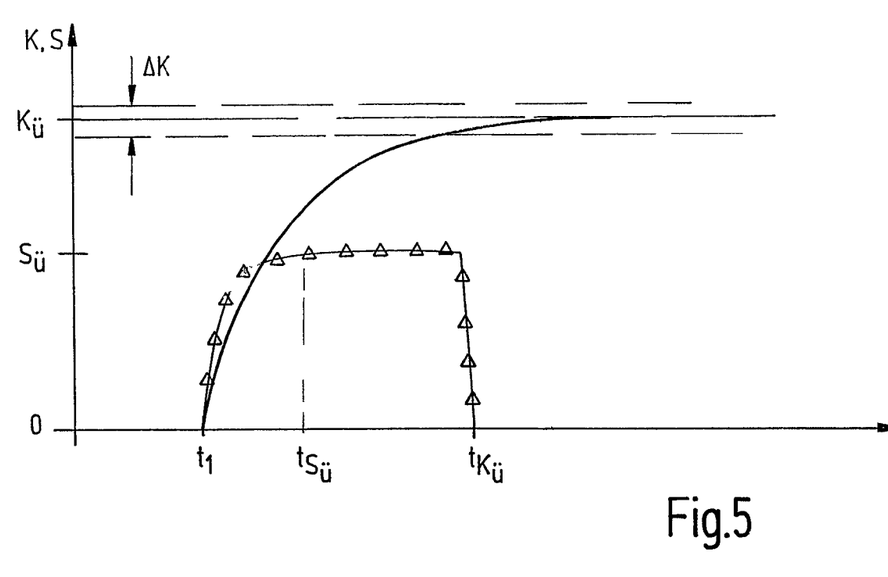
FIG. 5 shows a diagram, comparable to FIG. 2, of a friction clutch control variable and a shifting clutch control variable in order to explain the method according to the invention.

FIG. 5 in schematic form shows the main sequence in the activation of the clutch actuator K and the shift actuator S according to a further embodiment, which in general corresponds to the sequence shown in FIG. 2. Only the differences will be explained below.

FIG. 5 firstly shows that not only does a process for setting the clutch actuator K to the transitional value take up a certain time (from $t_1$ to $t_{KÜ}$), but rather that the process for setting the shift actuator S to a transitional value $S_{Ü}$ also takes a certain time (from $t_1$ to $t_{SÜ}$), which may be shorter than the time needed by the clutch actuator. The processes are initiated simultaneously (at time $t_1$), so that the shift actuator S, until it reaches its transitional value $S_{Ü}$, 'sees' only a relatively low counter-torque, if any, since the clutch actuator at time $t_{SÜ}$ is still far short of reaching its transitional value. As soon as the clutch actuator K reaches its transitional value $K_{Ü}$ (this is represented as time $t_{KÜ}$ at which the clutch actuator reaches the lower limit of the control variable range $\Delta K$), the shifting clutch SK is opened immediately in order to determine the speed gradient value, as described above.

Figure 6:
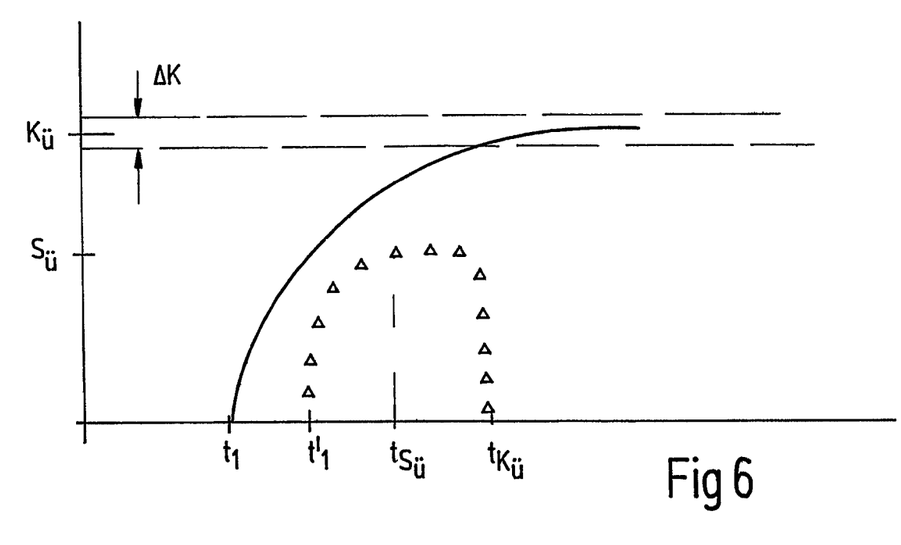
FIG. 6 shows a further diagram of a friction clutch control variable and a shifting clutch control variable in order to explain the method according to the invention.

FIG. 6 shows an alternative sequence in the activation of the clutch actuator K and the shift actuator S, which in general likewise corresponds to the sequence shown in FIG. 2. Only the differences will be explained below.

In this embodiment the process for setting the shift actuator S to the transitional value $S_{Ü}$ is initiated at a later time ($t_{1'}$) than the process for setting the clutch actuator K to its transitional value $K_{Ü}$ (which occurs at time $t_1$). The time offset between $t_{1'}$ and $t_1$ is selected so that the actuators reach their respective transitional values $K_{Ü}$, $S_{Ü}$ substantially at the same time, at time $t_{KÜ}$. At this time the shifting clutch is immediately opened again, in order to determine the speed gradient value, as described above.

The embodiment in FIGS. 2 to 5 is preferred to the embodiment in FIG. 6, since at the time at which the clutch actuator K has reached its transitional value $K_U$, the shift actuator S is already stably set to its transitional value $S_{Ü}$ and no further interactions therefore occur between these processes.

In all sequences previously described the clutch actuator K and preferably also the shift actuator S are activated, so that the respective transitional values $K_{Ü}$, $S_{Ü}$ are attained without overshooting. Hysteresis problems can thereby be avoided.

Figure 7:
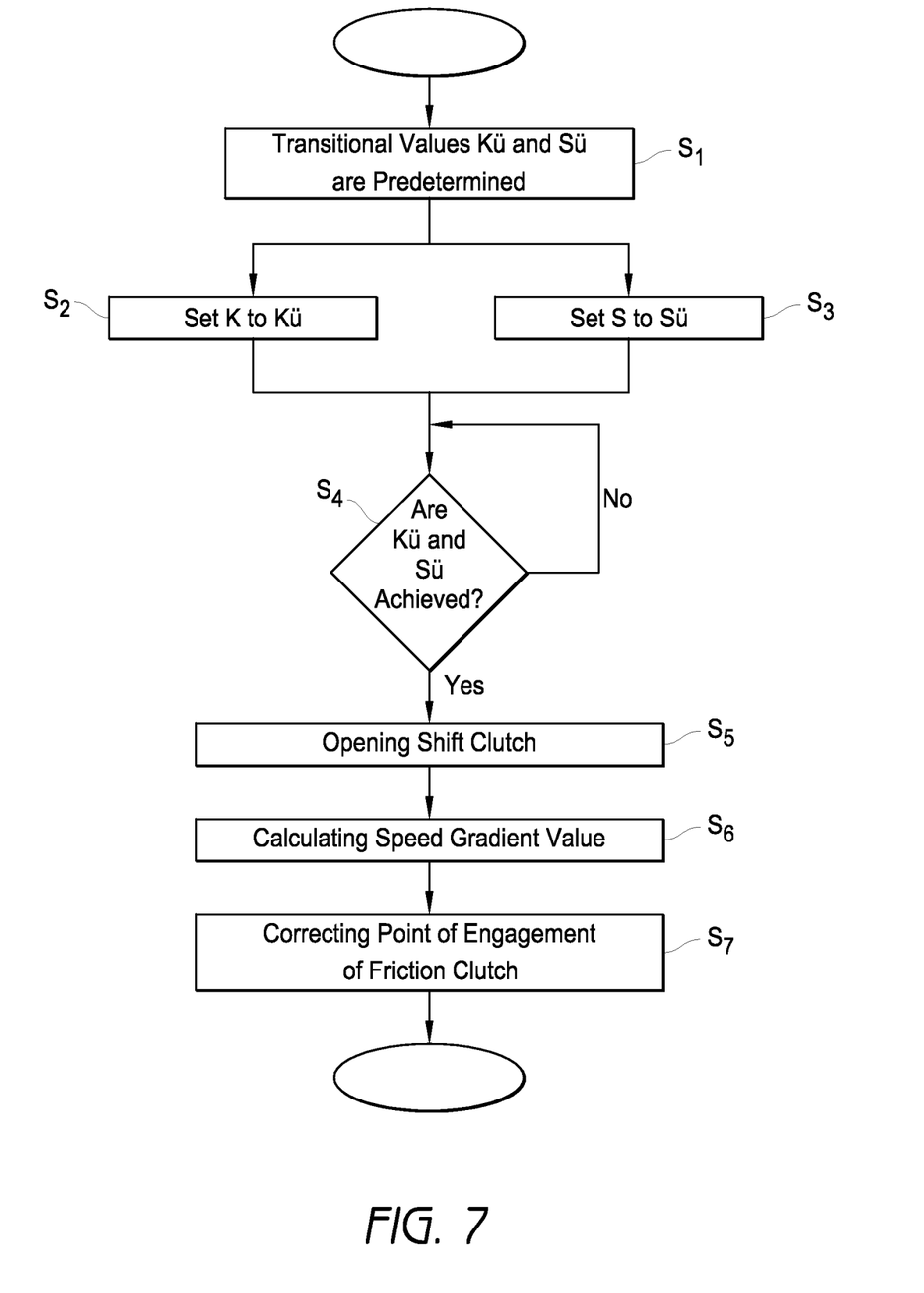
FIG. 7 shows a flow chart representing one embodiment of the method according to the invention.

FIG. 7 shows a flow chart of an embodiment of the method according to the invention, in which the processes for setting the clutch actuator and the shift actuator to their respective transitional value are initiated simultaneously, as is shown in FIGS. 2, 3, 4 and 5.

In a step S1 the clutch control variable and the shift actuator are first predetermined, that is to say the transitional values $K_{Ü}$ and $S_{Ü}$ are fixed.

In the steps S2 and S3, which take place simultaneously, the processes for setting the clutch actuator K to its transitional value $K_{Ü}$ and for setting the shift actuator S to its transitional value $S_{Ü}$ are initiated simultaneously.

In step S4 an enquiry is made as to whether the clutch actuator K and also the shift actuator S have reached their respective transitional state $K_{Ü}$, $S_{Ü}$. If not, step S4 is repeated. As soon as the transitional values $K_{Ü}$ and $S_{Ü}$ are reached, the shifting clutch is opened in step S5, that is to say the shift actuator S is released. The speed gradient value is thereupon calculated in step S6. In step S7 the point of engagement of the friction clutch is if necessary corrected, depending on the result of the speed gradient value calculation.

In all the aforementioned methods it is possible to monitor the running performance and to perform the method according to the invention as a function of this. It will be obvious that the adjustment or adaptation of the point of engagement of the friction clutch can here already be undertaken when certain deviations that have occurred are not yet apparent to the driver. In other words the adjustment of the point of engagement is to be performed so that the driver does not notice that an adaptation has taken place.

For this purpose it is furthermore possible, for example, to initiate the method according to the invention at relatively short intervals, for example every 10 to 15 min whilst underway. Here it is possible, without departing from the scope of the invention, for the adjustment or adaptation of the point of engagement of the friction clutch to be performed at very short time intervals, for example every 2 to 50 ms, in particular 5 to 20 ms, with the aim of optimizing the overall functioning of the clutch.

The invention claimed is:

1. A method for adjusting the point of engagement of a friction clutch in a motor vehicle,
the motor vehicle having a combustion engine and a step variable transmission,
the step variable transmission having a friction clutch,
the friction clutch being controllably actuated by a clutch actuator,
the step variable transmission including at least one gear ratio and at least one synchronizing shifting clutch, the at least one synchronizer shifting clutch being controllably actuated by means of a shift actuator for the engagement and disengagement of the at least one gear ratio, the method comprising the steps of:
controllably actuating the friction clutch by means of the clutch actuator,
controllably actuating the at least one synchronizer shifting clutch by means of the shift actuator,
adjusting a set-point of the clutch actuator for the point of engagement of the friction clutch as a function of a speed gradient value,
wherein the set-point of the clutch actuator is derived from a transitional state with the friction clutch actuated and the shifting clutch actuated, once the shifting clutch is opened, and
wherein the transitional state is established by setting the clutch actuator and the shift actuator to a respective transitional value substantially at the same time.

2. Method according to claim 1, wherein the clutch actuator in the transitional state is set to a transitional value which corresponds to the previous set-point for the point of engagement.

3. Method according to claim 1, wherein the shift actuator is activated in the transitional state in order to close the associated shifting clutch.

4. Method according to claim 1, wherein the shift actuator is activated in the transitional state in order to transmit a higher torque via the shifting clutch than via the friction clutch, without closing the associated shifting clutch.

5. Method according to claim 1, wherein the adjustment of the point of engagement of the friction clutch occurs in an inactive branch of a dual clutch transmission, whilst the vehicle is underway.

6. Method according to claim 5, wherein the shifting clutch used for adjusting the point of engagement of the friction clutch is assigned to the gear ratio which is adjacent to the gear ratio used in the active branch.

7. Method according to claim 1, wherein the adjustment of the point of engagement of the friction clutch is performed whilst the vehicle is stationary.

8. Method according to claim 1, wherein a reference measurement is performed prior to the adjustment of the point of engagement, in order to take account of the drag torque thereby acting in the relevant branch.

9. Method according to claim 8, wherein for the reference measurement an adjust-ment of a transitional value of the shift actuator and a subsequent opening of the associated shifting clutch together with a determination of the speed gradient value are performed whilst the friction clutch is opened.

10. Method according to claim 1, wherein the opening of the shifting clutch ensues from the transitional state, once the transitional value of the clutch actuator has attained a value within a set range.

11. Method according to claim 1, wherein the speed gradient value, as a function of which the set-point of the clutch actuator for the point of engagement is adjusted, is the speed gradient value of the input shaft of the transmission.

12. Method according to claim 1, characterized in that the speed gradient value, as a function of which the set-point of the clutch actuator for the point of engagement is adjusted, is measured at a time immediately before the relevant speed has attained a value that ensues on the basis of the transitional value of the clutch actuator.

13. Method according to claim 1, wherein the speed gradient value is a filtered value of a plurality of measurements of the speed gradient, which are carried out after opening of the shifting clutch from the transitional state and before attainment of the target speed.

14. Method according to claim 13, wherein the target speed is a speed of an input element of the friction clutch.

15. Method according to claim 13, wherein the majority of measurements of the speed gradient are completed when the speed has reached a value which differs from the target speed by a first predefined speed differential.

16. Method according to claim 13, wherein the majority of measurements of the speed gradient are commenced once the speed has varied from the transitional state by a second predefined speed differential.

17. Method according to claim 13, wherein the majority of measurements of the speed gradient are filtered by weighting more recent measured values more heavily than earlier measured values.

18. Method according to claim 17, wherein the filtering is performed according to the following recursion formula:

$$DGn+1(\text{filtered})=DGn+1(\text{unfiltered})*K1+DGn(\text{filtered})*K2,$$

where DGn is the nth measured value of the speed gradient and where K1 and K2 are constants, for which K1>K2.

19. Method according to claim 18, characterized in that K1+K2=1.

20. Method according to claim 1, wherein the transitional state is established in that a process for setting the clutch actuator to a transitional value and a process for setting the shift actuator to a transitional value are, at least in sections, carried out in parallel.

21. Method according to claim 1, wherein the shifting clutch is opened from the transitional state as soon as the clutch actuator and the shift actuator have reached their respective transitional state.

22. Method according to claim 1, wherein the clutch actuator and the shift actuator are activated so that the shift actuator reaches its transitional value earlier than the clutch actuator.

23. Method according to claim 1, wherein a process for setting the clutch actuator to a transitional value and a process for setting the shift actuator to a transitional value are initiated substantially at the same time.

24. Method according to claim 1, wherein at least one of the clutch actuator and the shift actuator is activated so that the respective transitional value is attained without over-shooting.

25. Method according to claim 1, wherein the clutch actuator and the shift actuator can be activated independently of one another.

26. A method for adjusting the point of engagement of a friction clutch in a motor vehicle,
   the motor vehicle having a combustion engine and a step variable transmission,
   the step variable transmission having a friction clutch,
   the friction clutch being controllably actuated by a clutch actuator,
   the step variable transmission including at least one gear ratio and at least one synchronizing shifting clutch, the at least one synchronizer shifting clutch being controllably actuated by means of a shift actuator for the engagement and disengagement of the at least one gear ratio, the method comprising the steps of:
   controllably actuating the friction clutch by means of the clutch actuator,
   controllably actuating the at least one synchronizer shifting clutch by means of the shift actuator,
   adjusting a set-point of the clutch actuator for the point of engagement of the friction clutch as a function of a speed gradient value,
   wherein the set-point of the clutch actuator is derived from the transitional state with the friction clutch actuated and the shifting clutch actuated, once the shifting clutch is opened, and
   wherein the transitional state is established in that a process for setting the clutch actuator to a transitional value and a process for setting the shift actuator to a transitional value are, at least in sections, carried out in parallel.

27. Method according to claim 26, wherein the shifting clutch is opened from the transitional state as soon as the clutch actuator and the shift actuator have reached their respective transitional state.

28. Method according to claim 26, wherein the clutch actuator and the shift actuator are activated so that the shift actuator reaches its transitional value earlier than the clutch actuator.

29. Method according to claim 26, wherein a process for setting the clutch actuator to a transitional value and a process for setting the shift actuator to a transitional value are initiated substantially at the same time.

30. Method according to claim 26, wherein at least one of the clutch actuator and the shift actuator is activated such that the respective transitional value is attained without overshooting.

31. Method according to claim 26, wherein the clutch actuator and the shift actuator can be activated independently of one another.

* * * * *

UNITED STATES PATENT AND TRADEMARK OFFICE
CERTIFICATE OF CORRECTION

PATENT NO. : 8,725,372 B2  
APPLICATION NO. : 12/783447  
DATED : May 13, 2014  
INVENTOR(S) : Rinck et al.

Page 1 of 1

It is certified that error appears in the above-identified patent and that said Letters Patent is hereby corrected as shown below:

In the Specification

In column 8 at line 52, Change "trans-mission" to --transmission--.

In column 10 at line 4, Change "trans-mission" to --transmission--.

In column 10 at line 8, Change "trans-mission" to --transmission--.

In column 10 at line 49, Change "$\Delta n_e$" to --$\Delta n_2$--.

In the Claims

In column 13 at line 66, In Claim 9, change "adjust-ment" to --adjustment--.

In column 14 at lines 42-43, In Claim 18, change "$DGn+1(filtered)=DGn+1(unfiltered)*K1+DGn(filtered)*K2,$" to --$DG_{n+1}(filtered)=DG_{n+1}(unfiltered)*K1+DG_n(filtered)*K2$--.

In column 14 at line 44, In Claim 18, change "DGn" to --$DG_n$--.

In column 14 at lines 66-67, In Claim 24, change "over-shooting" to --overshooting--.

Signed and Sealed this  
Fourth Day of November, 2014

Michelle K. Lee  
*Deputy Director of the United States Patent and Trademark Office*